(No Model.)

M. KAMPF.
REEL FOR BARBED WIRE.

No. 355,090. Patented Dec. 28, 1886.

WITNESSES:
John A. Ellis
C. Sedgwick

INVENTOR:
M. Kampf
BY Munn & Co.
ATTORNEYS.

UNITED STATES PATENT OFFICE.

MATTHIAS KAMPF, OF MINIER, ILLINOIS.

REEL FOR BARBED WIRE.

SPECIFICATION forming part of Letters Patent No. 355,090, dated December 28, 1886.

Application filed May 14, 1886. Serial No. 202,187. (No model.)

*To all whom it may concern:*

Be it known that I, MATTHIAS KAMPF, of Minier, in the county of Tazewell, and the State of Illinois, have invented a new and Improved Reel for Barbed Wire, of which the following is a full, clear, and exact description.

The object of my invention is to provide a new and improved reel for winding up, unwinding, and stretching barbed wire.

The invention consists of various parts and details and combinations of the same, as will be fully described hereinafter, and then pointed out in the claim.

Reference is to be had to the accompanying drawings, forming part of this specification, in which similar letters of reference indicate corresponding parts in all the figures.

Figure 1:
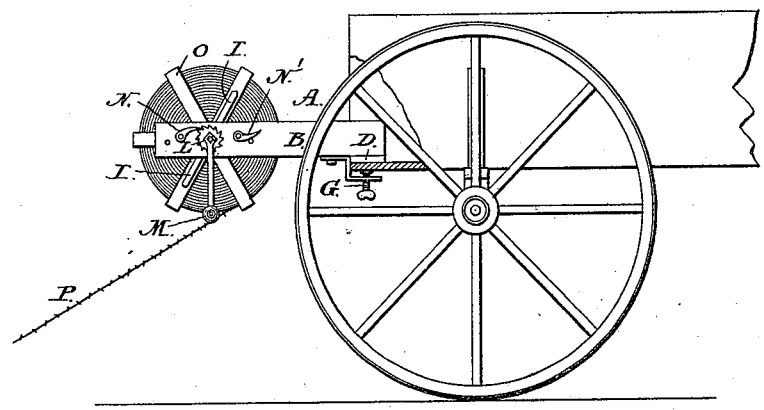
Figure 2:
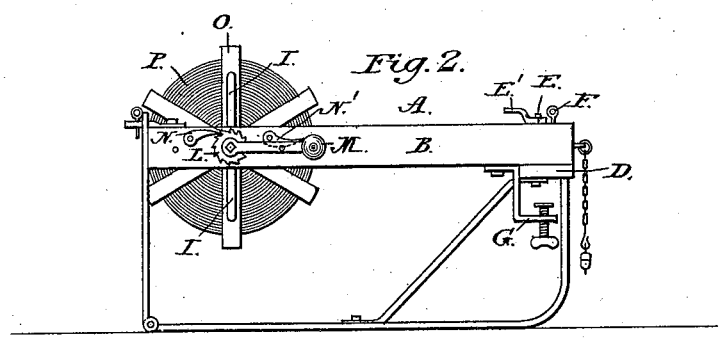
Figure 3:
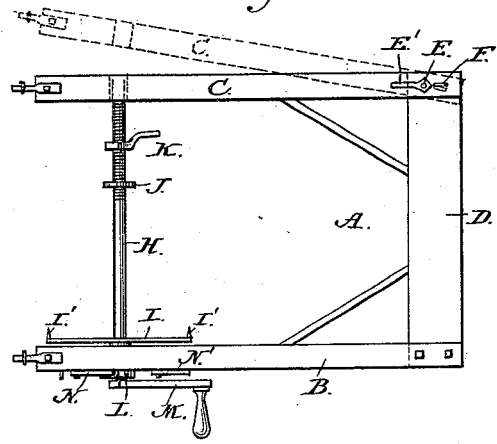

Figure 1 is a side elevation of my improvement attached to a wagon. Fig. 2 is a side elevation of the same attached to a sled. Fig. 3 is a plan view of my improvement.

The reel A is composed of the side beams, B and C, and the end beam, D, which is rigidly bolted to the beam B on one end, and through its other end and the rear part of the side beam C passes a bolt, E, on which swings the side beam C, which can also be held in a position parallel with the side beam B by the nut E', screwed on the bolt E, and the pin F, which passes through the said side beam C and the end beam, D.

The rear end of the frame A is fastened to a wagon or sled, as shown in Figs. 1 and 2, by means of a clamp, G, or other suitable device. When fastened to a sled, as shown in Fig. 2, I pivot the rear bar of the sled to the runner and provide the side beams B and C with extensions, which are fastened to the rear uprights of the sled in any suitable manner.

The reel-shaft H is mounted in the side beams, B and C, and is provided on the inside of the side beam B with a double clamping-arm, I, having the inwardly-projecting pins I'. One end of the shaft H is screw-threaded, and on it screws the nut K, and the washer J is also placed on the said shaft. The shaft H projects on the outside of the beam B, and on this outer end are keyed a ratchet-wheel, L, and a crank-arm, M. The pawls N and N' are pivoted to the side beam B, one at each side of the ratchet-wheel L.

The operation is as follows: In order to place the reel O, carrying the barbed wire P, on the spindle H, it is necessary to remove the pin F and unscrew the nut E' from the bolt E, so that the side beam C can be swung outward, as shown in dotted lines in Fig. 3, and the nut K and washer J are then removed from the spindle H. The reel O is then slipped on the spindle H, and is pressed against the clamping-arm I, so that the pins I' of the arm I penetrate into two opposite arms of the reel O. The collar or washer J is then placed on the spindle H against the reel O, and the nut K is screwed up against the washer J, so as to hold the reel O securely in place. The wire P can then be unwound from the reel O by turning the handle M, and can be stretched when one end of the unwound wire is fastened to a post by turning the handle M in the opposite direction.

The reel can be held in a locked position by one of the pawls N N', which can be thrown into engagement with the ratchet-wheel L. The latter can be reversed on the ratchet to enable the operator to unwind the wire from either the top or the bottom of the reel. Only one pawl is in action at a time, and the other is used when the ratchet-wheel is reversed.

Having thus fully described my invention, I claim as new and desire to secure by Letters Patent—

A reel for barb-wire comprising side beams, B C, and end beam, D, having a clamp, G, on the under face, the beam C being pivotally connected to the beam D to swing laterally, bearings in the free ends of the side beams, the shaft H journaled at one end in the beam B and having its opposite end resting in the bearing in beam C, the arms I, the washer J and nut K on the shaft, whereby the reel may readily be secured to a vehicle, and a spool placed on the shaft without removing it, substantially as set forth.

MATTHIAS KAMPF.

Witnesses:
J. N. LEE,
JAMES MURPHY.